Nov. 21, 1939.  V. W. KLIESRATH  2,180,592
VEHICLE
Filed Jan. 6, 1938  5 Sheets-Sheet 1
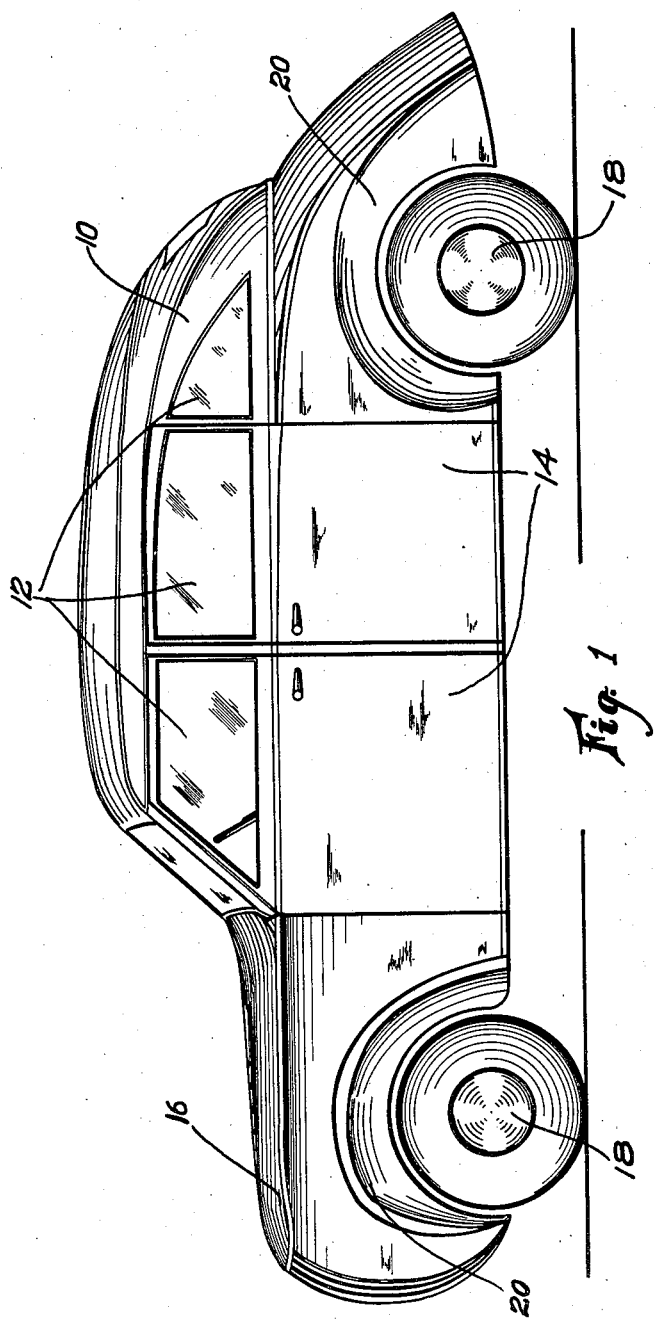
INVENTOR.
VICTOR W. KLIESRATH
BY
McConkey, Dawson, & Booth
ATTORNEY.

Nov. 21, 1939.     V. W. KLIESRATH     2,180,592
VEHICLE
Filed Jan. 6, 1938     5 Sheets-Sheet 2
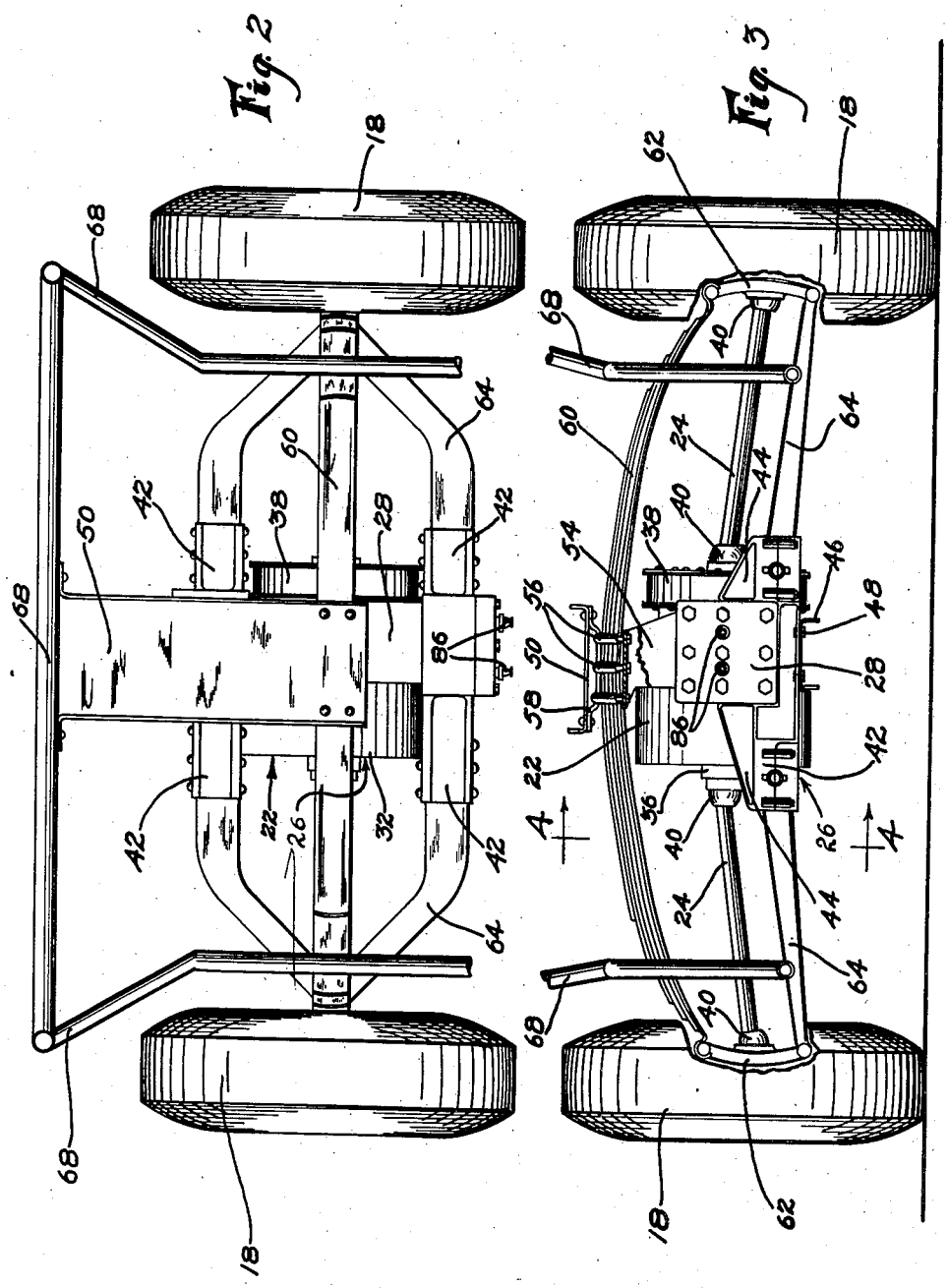
INVENTOR.
VICTOR W. KLIESRATH
BY
McConkey, Dawson, & Booth
ATTORNEY.

Nov. 21, 1939.　　　V. W. KLIESRATH　　　2,180,592
VEHICLE
Filed Jan. 6, 1938　　　5 Sheets-Sheet 3
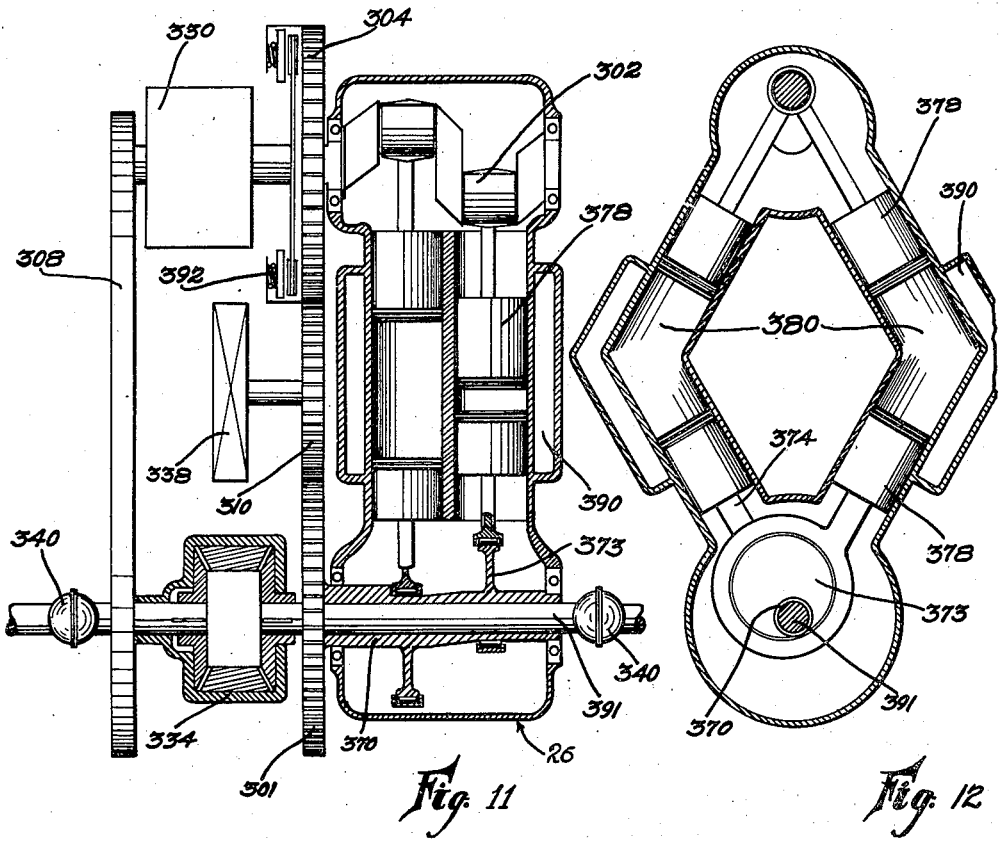
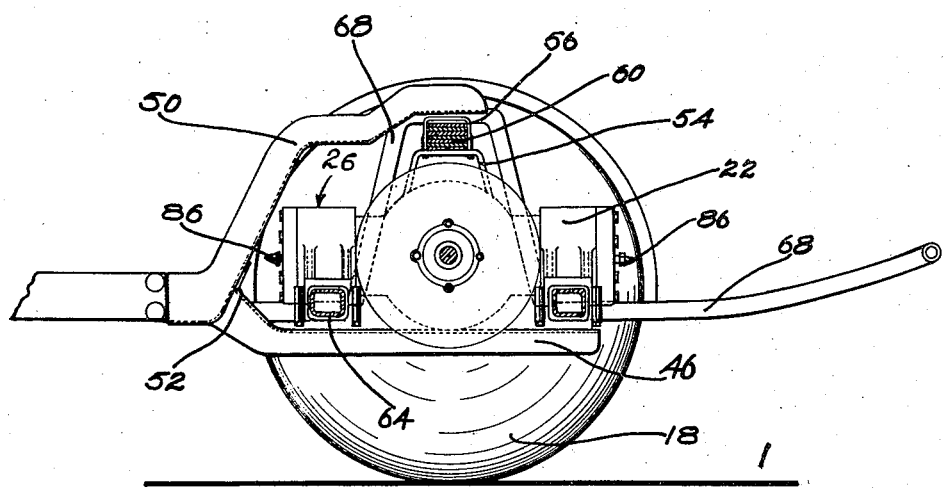
INVENTOR.
*VICTOR W. KLIESRATH*
BY
ATTORNEY.

Nov. 21, 1939.  V. W. KLIESRATH  2,180,592

VEHICLE

Filed Jan. 6, 1938  5 Sheets-Sheet 4

INVENTOR.
VICTOR W. KLIESRATH
BY
McConkey, Dawson & Bork
ATTORNEY.

Nov. 21, 1939.  V. W. KLIESRATH  2,180,592
VEHICLE
Filed Jan. 6, 1938  5 Sheets-Sheet 5
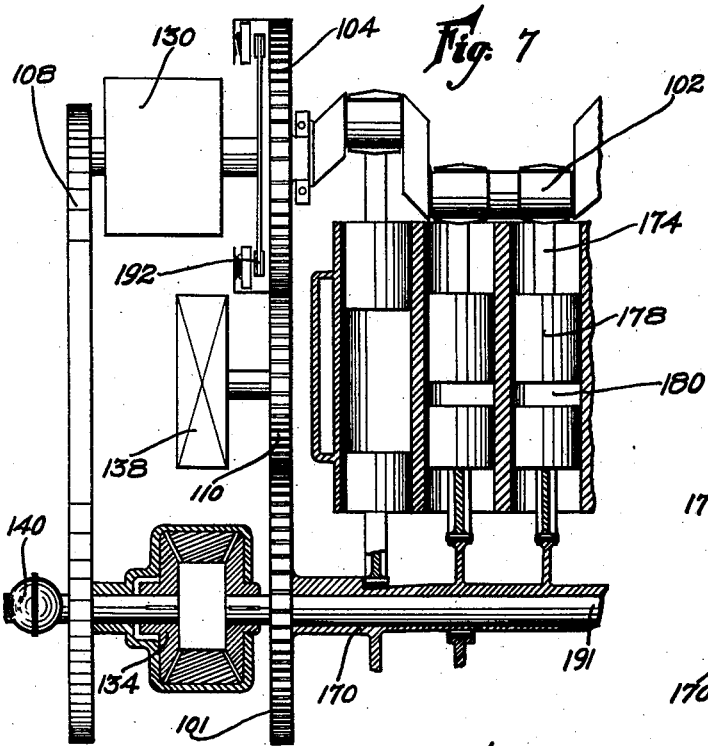
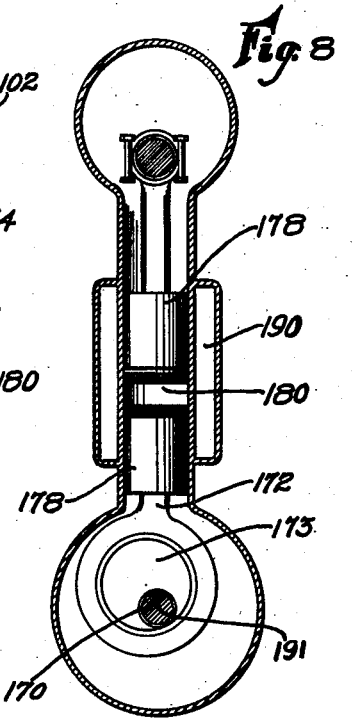
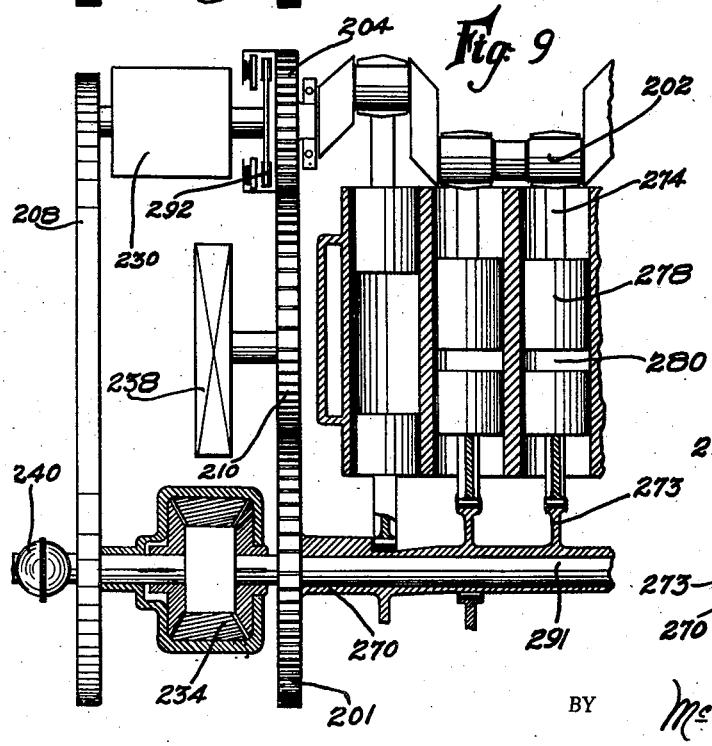
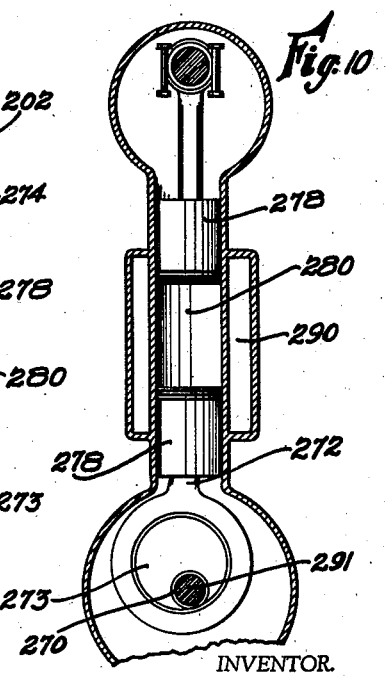
INVENTOR.
VICTOR W. KLIESRATH
ATTORNEY.

Patented Nov. 21, 1939

2,180,592

UNITED STATES PATENT OFFICE 2,180,592

VEHICLE

Victor W. Kliesrath, South Bend, Ind., assignor, by mesne assignments, to International Engineering Corporation, Chicago, Ill., a corporation of Illinois Application January 6, 1938, Serial No. 183,625

5 Claims. (Cl. 180—54)

This invention relates to automobiles and the like and more particularly to such vehicles having engines capable of being mounted on the rear shaft, with a direct drive thereto.

An object of this invention is to provide an automobile with an engine mounted in its rear part which will be easily accessible to the operator or mechanic for readjustment or repair.

Another object of the invention is to provide an engine using an eccentric shaft thus avoiding the bulkiness of one using a crankshaft.

A further object of the invention is to provide an automobile with an engine utilizing a hollow shaft in place of the usual crankshaft, the hollow shaft being arranged to enclose the driven shaft, thereby providing a very compact assembly.

A still further object of the invention is to provide an automobile with an engine which is compact and economical, mounted in the rear of the automobile upon suitable bracket or support means leaving the front hood space clear and free for spare tires, luggage, etc. and minimizing noise inside the body of the automobile.

These and other objects and features of the invention, including various and novel combinations and desirable particular constructions, will be apparent from the following description of the illustrative embodiments shown in the accompanying drawings, in which:

Figure 1 is a side elevational view of an automobile embodying my novel engine in its rear part;

Figure 2 is a plan view of the rear portion of the chassis showing the manner of supporting my novel engine therein;

Figure 3 is a rear elevational view showing further the matter disclosed in Figure 2;

Figure 4 is a section taken on line 4—4 of Figure 3 showing further the manner of mounting in the rear of the automobile;

Figure 7 is a horizontal section corresponding to Figure 6 of a modification of my invention employing a different type of engine;

Figure 8 is a vertical section through the engine shown in Figure 7;

Figure 9 is a horizontal section corresponding to Figure 6 of another modification of my invention employing still another type of engine;

Figure 10 is a vertical section through the engine shown in Figure 9;

Figure 11 is a horizontal section corresponding to Figure 6 of still another modification of my invention employing still another type of engine; and Figure 12 is a vertical section through the engine shown in Figure 11.

Figure 6:
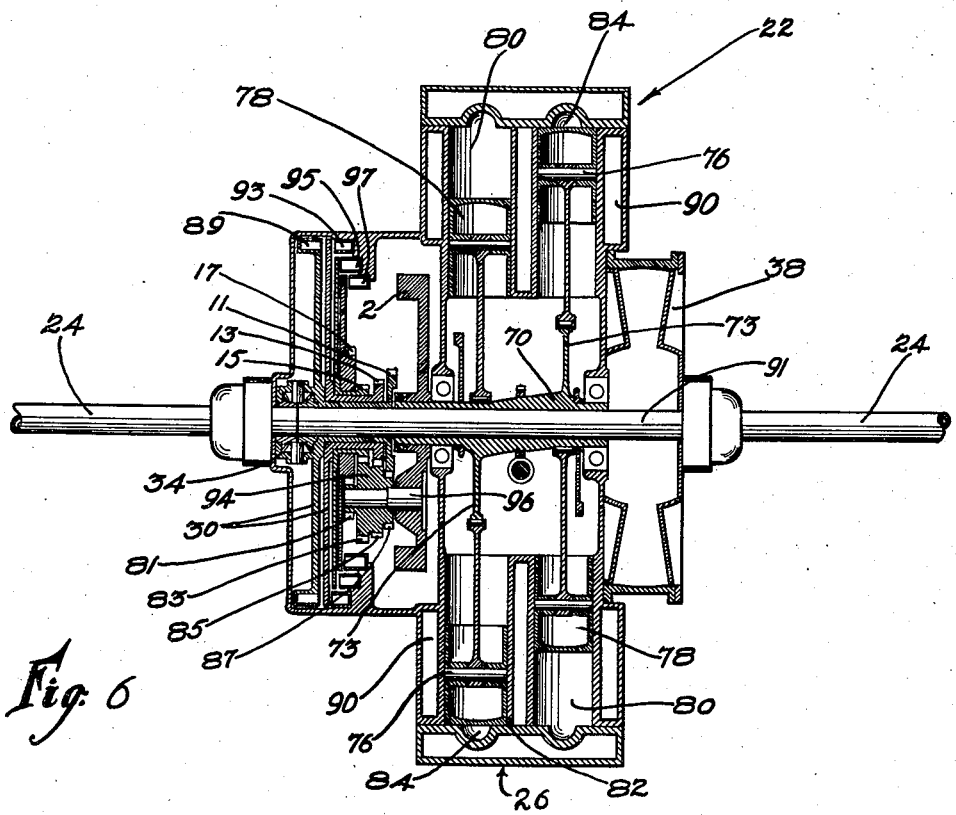
Figure 6 is a horizontal section through my novel rear drive engine.

Referring now more specifically to the drawings there is shown in Figure 1 in a side elevational view an automobile having generally a body 10, windows 12, doors 14, a front removable hood 16 having space therein to store spare tires, tools, and luggage, wheels 18, and fenders 20.

The desirable and novel features of the invention repose in the economical construction and compact arrangement in the rear part of the automobile 10 of the novel power plant unit 22 shown in Figures 2 and 3 of the drawings mounted about the rear axle sections 24. My novel power plant unit 22 is comprised of the engine 26 (to be described more fully hereinafter) carried in the engine housing 28, a compact transmission unit 30 carried in the housing 32, and a differential unit 34 carried in the housing 36. A supercharger 38 is also shown mounted on the axle sections 24 (Figures 2 and 3).

Universal joints 40 are mounted on the axle sections 24 next to the differential 34, supercharger 38 and the wheels 18.

The power plant unit 22 is rigidly mounted upon and carried by a bracket 42. The bracket 42 has vertically extending portions having webbed flanges 44 into which the power plant unit 22 fits snugly. The bottom of the bracket 42 is bolted to a rigid channel shaped member 46 by means such as bolts 48. The channel shaped member 46 is welded or otherwise secured to the motor mounting clamp member 50 at its inner end 52.

The upper part of the power plant unit 22 has formed integrally therewith a bracket member 54 which is bolted by means of U-bolts 56 to a broad U-shaped plate 58. The plate 58 is riveted or otherwise rigidly secured to the motor mounting clamp member 50 and has clamped between it and the bracket member 54 a semi-elliptic spring 60 which at its two outer ends is connected to the wheels 18 at the ends of the knuckle members 62. Secured to the lower ends of the members 62 are two Y-shaped rigid arms 64 which at their inner ends are mounted in sockets in the ends of the brackets 42. For this particular construction reference is made to show the socket construction to applicant's Patent 2,073,873 issued March 16, 1937.

As described above it will be seen that the power plant unit 22 receives its rigid support from the bracket member 42 being fastened to the lower arm 46 of the motor mounting clamp member 50 and the bracket 54 which is held by the motor mounting clamp member 50. The rear frame member 68 is rigidly secured by means such as rivets to the base of the motor mounting clamp bracket 50, as shown in Figures 2 and 4.

Figure 5:
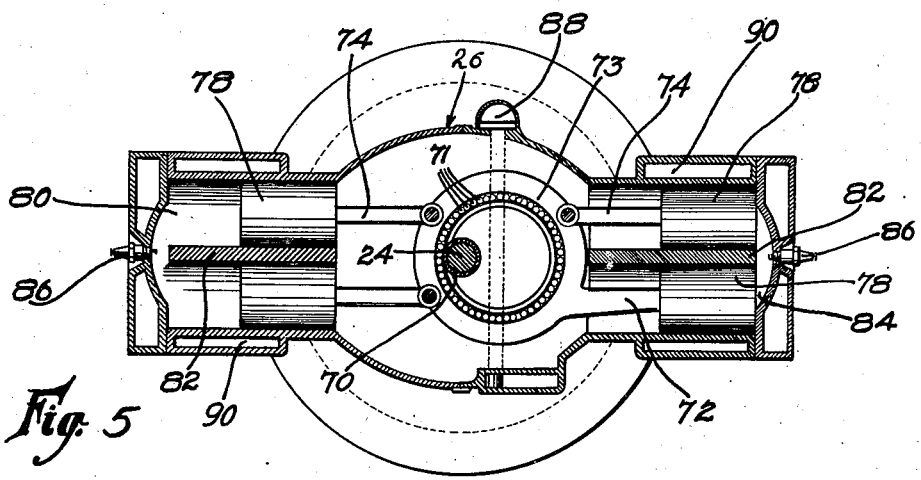
Figure 5 is a vertical section through my novel engine utilizing an eccentric shaft.

Coming now more specifically to my novel engine which is intended for use as a rear drive for an automobile, Figures 5 and 6 illustrate one embodiment thereof. The power plant unit 22 is there shown as embodying the engine proper, clutch means, transmission, and differential within its housing. At one end of the power plant unit 22 is a supercharger 38 having adjacent to it a universal joint 40 on the axle 24. Adjacent to the differential member 34 is also a universal joint 40.

Surrounding the axle 24 is a hollow shaft 70 provided with eccentrics 73 having mounted thereon by means of needle bearings 71, master rods 72. The master rods 72 have secured thereto piston rods 74. At their outer ends the master rod 72 and the piston rods 74 have pistons 78 attached thereto by means of pins 76.

Formed within the power plant unit housing are twin water-cooled cylinders 80 which receive slidably therein the pistons 78. Each twin cylinder 80 has a dividing wall 82 permitting the sliding action of each pair of pistons 78 without interfering with each other. At the end of each twin cylinder 80 is formed a grooved portion or combustion chamber 84 which connects the cylinder chambers for the flow of fuel and exhaust gases. Spark plugs 86, placed in these combustion chamber 84, are controlled by a distributor 88. Formed in the power plant unit housing and surrounding the cylinder chambers are water jackets 90 to cool the same. The utilization of the eccentrics on the hollow shaft 70 dispenses with the necessity of the usual crankshaft and permits the engine to be mounted transversely in the rear part of the automobile around its rear axle, thus obviating the bulkiness and complications of an ordinary drive engine. This is accomplished by connecting the differential 34 directly to one axle section 24 through one of the universal joints, and connecting it to the other section 24 by means of a driven shaft 91 passing through the hollow shaft 70.

In the embodiment of Figures 5 and 6 there is illustrated a two stroke engine into which the fuel mixture is compressed by the supercharger 38. As the inflow of the fuel takes place from the supercharger into the cylinders the compression stroke is in progress. When a predetermined point is reached the fuels are ignited and the explosion occurring causes the beginning of the power stroke. In the progress of such power stroke the exhaust gases escape and the inflow again occurs in one cylinder while in the opposite cylinder the pistons are traveling on their compression stroke. As the expansion and power strokes take effect the eccentrics on the shaft 70 receive their drive causing rotation of the shaft about the axle sections 24.

The transmission employed in my novel rear engine driving mechanism is as follows. A flywheel 2 is keyed to the hollow eccentric shaft 70 and carries a plurality of stud shafts 96 (one being shown). Each of the stud shafts 96 carries a set of four planet gears 81, 83, 85 and 87.

The gear 87 upon the stud shaft 96 meshes with the gear 11 secured to a sleeve rotatably mounted on the driven shaft 91 of the axle sections 24. This sleeve has attached rigidly to it the housing of the differential 34 which drives the driver shaft 91 and the axle sections 24. Formed integrally with the sleeve is a disk which has at its outer periphery, a magnetic clutch 89. The second gear 85 upon the stud shaft 96 is somewhat larger and it meshes with the gear 13 having a sleeve rotatably mounted on the sleeve of the gear 11 and which has rigidly secured thereto a disk which rotates adjacent the magnetic clutch 93, the latter being secured to the transmission housing 32 as illustrated in Figure 6.

The largest gear 83 upon the stud shaft 96 meshes with the gear 15 which has a sleeve rotatably mounted on the sleeve of the gear 13 and which has rigidly secured thereto a disk which rotates adjacent the magnetic clutch 95 mounted on the transmission housing 32 similarly to the magnetic element 93.

The fourth and smallest gear 81 upon the stud shaft 96 is the reverse gear and it meshes with the gear 17 which is rotatably mounted on the sleeve of gear 15 and which is rigidly secured to a disk which rotates adjacent to the magnetic clutch 97 mounted on the housing 32, the same as the above mentioned magnetic clutches.

When the driven shaft 91 and the axle sections 24 are at rest the flywheel 2 and all the gears rotate freely about the driven shaft 91.

To operate the vehicle at low speed the magnetic clutch 93 is energized and the sleeve and gear 13 become stationary. As the fly-wheel rotates the gear 85 rolls on the now stationary gear 13, and the gear 87 drives the gear 11 in a forward direction but at a speed lower than the engine speed.

To operate the vehicle at intermediate or second speed the magnetic clutch 95 is energized, stopping the gear 15 and the sleeve carrying it. Thereupon the gear 83 of the planet set 94 rolls on the gear 15 and the planet gear 87 drives the gear 11, its sleeve and the differential at a speed less than the engine speed but at a smaller ratio than in low gear because of the different ratio between gears 15 and 83 as compared to the ratio of gears 13 and 85.

When the magnetic clutch 89 is energized the disk of gear 13 is locked to the disk carrying clutch 89 locking the whole system and causing the drive gear 11 to rotate at the same speed as the flywheel 2 giving high speed drive to the vehicle.

To obtain a reverse drive the magnetic clutch 97 is energized. As the clutch 97 is magnetized the sleeve carrying gear 17 becomes stationary and the gear 81 of the planet set 94 rolls on the stationary gear 17, whereupon the gear 87 drives the gear 11, its sleeve and the differential 34 in the reverse direction to the rotation of the engine and at a lower speed in a manner which will be well understood by one skilled in the art of gearing.

If the engine were mounted and used as shown in Fig. 3, the high gear drive as explained above would in some cases not be utilized in ordinary driving (i. e. it would be "overdrive") unless a mechanical speed-reducing element were inserted between the axle sections 24 and the driven shaft 91 and differential 34 so as to decrease the speed of the axle sections 24 from the speed of the flywheel 2, as the gearing shown would not in itself give sufficient gear reduction for such vehicles for ordinary driving.

In the modification of Figures 7 and 8 a Junker's opposed type engine is illustrated and in these figures parts corresponding to like parts in Figures 5 and 6 are designated by the same reference numeral plus 100. The modification discloses a drive shaft 191 having mounted about it the hollow shaft 170 provided with eccentrics 173 having master rods 172 carrying the pistons 178 slidably within the cylinders 180. Directly opposing the action of these pistons 178 are pistons 178 carried by a crankshaft 102 by means of other piston rods 174.

As the crankshaft 102 is rotated the flywheel 104 being attached thereto rotates also. When the clutch 192 is engaged the speed desired is selected by means of a suitable transmission 130 and such speed is imparted to the gear 106 which in turn causes the movement of the silent chain 108 which in turn imparts rotation to the differential member 134 driving one axle section 124 directly and the other one through shaft 191. The flywheel 104 and a flywheel 101 on the hollow shaft 170 are drivingly connected by an intermediate gear 110.

In the modification of Figures 9 and 10 a modification of the Junker's opposed type engine of Figures 7 and 8 is illustrated and in these figures parts corresponding to like parts in Figures 5 and 6 are designated by the same reference numerals plus 200. This modification embodies an eccentric shaft 270 being mounted around the driven shaft 291 and having master rods 272 connected to pistons 278 within the cylinders 280. Since in this case the flywheel 204 is half the size of the flywheel 104 disclosed in Figure 7 the crankshaft 202 travels twice the speed of the eccentric shaft 270 or the pistons 278 of the crankshaft 202 travel into the cylinder 280 twice for each time of the piston 278 traveling with the eccentric shaft 270, and since in this case the crankshaft 202 runs twice the speed of the eccentric shaft 270 over-expansion in the cylinders is obtained.

A further modification is illustrated in Figures 11 and 12 in which parts corresponding to parts in Figures 5 and 6 are designated by the same reference numeral plus 300. The engine illustrated is an opposed piston type and is shown as being compactly arranged within its housing. Around the shaft 391 is mounted the eccentric shaft 370 having on each of its eccentrics 373 a pair of connecting rods 374 traveling at an angle with respect to each other as shown in Figure 12. The pistons 378 oppose each other and as the crankshaft 302 is rotated the flywheel 304 rotates.

With the engagement of the clutch 392 the drive is imparted through the transmission 330 to the silent chain 308 and to the differential member 334 which transmits the drive to one axle section 324 and to the shaft 391, which causes movement of the automobile 10. The embodiment here shown utilizes the opposed piston type engine having two sets of opposed pistons in cylinders which communicate with each other at an angle so as to form in effect a combination of two V-type engines in the same manner that the so-called Junker's opposed type engine might be considered a combination of two "in-line" engines.

While four illustrative embodiments have been described in detail it is not my intention to limit the scope of the invention to those particular embodiments or otherwise than by the terms of the appended claims.

I claim:

1. An automotive vehicle having at one end a support, wheels connected to said support by individual spring suspension devices, an engine mounted on said support and which has a transversely-extending hollow driven crankshaft, a differential at one end of the crankshaft, clutch and transmission means for drivably connecting the crankshaft to the differential at a plurality of speeds, means for connecting one side of the differential to one of said wheels, a shaft drivably connected at one end to the other side of the differential and extending through the hollow crankshaft, and means connecting the other end of said shaft to the other of said wheels.

2. An automotive vehicle having at one end a support, wheels connected to said support by individual spring suspension devices, an engine mounted on said support and which has a transversely-extending hollow driven crankshaft, a differential at one end of the crankshaft, clutch and transmission means for drivably connecting the crankshaft to the differential at a plurality of speeds, means for connecting one side of the differential to one of said wheels, a shaft drivably connected at one end to the other side of the differential and extending through the hollow crankshaft, and means connecting the other end of said shaft to the other of said wheels, said engine having cylinders arranged in pairs on opposite sides of and substantially in the plane of said crankshaft.

3. An automotive vehicle having at one end a support, wheels connected to said support by individual spring suspension devices, an engine mounted on said support and which has two transverse horizontal crankshafts one of which is a transversely-extending hollow driven crankshaft, a differential at one end of the hollow crankshaft, driven means connected to said crankshafts and including clutch and transmission means for driving said differential at a plurality of speeds, means for connecting one side of the differential to one of said wheels, a shaft drivably connected at one end to the other side of the differential and extending through the hollow crankshaft, and means connecting the other end of said shaft to the other of said wheels.

4. An automotive vehicle driving mechanism comprising a hollow crankshaft, engine cylinders having pistons connected to drive said crankshaft, a driven shaft extending through said crankshaft, a differential mounted coaxially with the crankshaft and axially spaced from the end of the crankshaft and drivably connected to said driven shaft, a flywheel mounted on and driven by the crankshaft immediately adjacent said cylinders, and a multiple-speed transmission arranged between the flywheel and the differential and operable to connect them at different speeds and which includes a series of coaxial transmission members sleeved about said driven shaft.

5. An automotive vehicle driving mechanism comprising a hollow crankshaft, engine cylinders having pistons connected to drive said crankshaft, a driven shaft extending through said crankshaft, a differential mounted coaxially with the crankshaft and axially spaced from the end of the crankshaft and drivably connected to said driven shaft, a flywheel mounted on and driven by the crankshaft immediately adjacent said cylinders, and a multiple-speed transmission arranged between the flywheel and the differential and operable to connect them at different speeds.

VICTOR W. KLIESRATH.